United States Patent [19]
Kihara et al.

[11] 3,994,018
[45] Nov. 23, 1976

[54] ROTARY HEAD ASSEMBLY HAVING RESILIENT POSITIONING AND RESTRAINING MEANS MOUNTING THE HEAD

[75] Inventors: Nobutoshi Kihara; Katsumasa Takahashi, both of Tokyo, Japan

[73] Assignee: Sony Corporation, Tokyo, Japan

[22] Filed: Apr. 8, 1975

[21] Appl. No.: 566,539

[30] Foreign Application Priority Data
Apr. 26, 1974 Japan.............................. 49-47312

[52] U.S. Cl. .............................................. 360/105
[51] Int. Cl.² ..................... G11B 5/54; G11B 21/22
[58] Field of Search..................... 360/107, 105, 104

[56] References Cited
UNITED STATES PATENTS

| | | | |
|---|---|---|---|
| 3,633,186 | 1/1972 | Lynott et al. ....................... | 360/107 |
| 3,673,347 | 6/1972 | Schoenmakers.................... | 360/107 |

FOREIGN PATENTS OR APPLICATIONS

| | | | |
|---|---|---|---|
| 919,436 | 2/1963 | United Kingdom................ | 360/107 |

*Primary Examiner*—Robert S. Tupper
*Attorney, Agent, or Firm*—Lewis H. Eslinger; Alvin Sinderbrand

[57] ABSTRACT

A rotary head assembly is disclosed including a transducer for recording information on and reproducing information from a record medium. The transducer is resiliently supported by a resilient support member which, in turn, is secured to a transducer receiving structure, the latter being coupled to a rotary drive device for rotating the transducer about an axis of rotation to thereby permit information to be recorded on and reproduced from the record medium which is contacted by the transducer. In addition to resiliently supporting the transducer, the transducer receiving member also exerts a restraining force on the transducer which is opposite to the centrifugal force exerted thereon when the transducer is rotated.

9 Claims, 7 Drawing Figures

ROTARY HEAD ASSEMBLY HAVING RESILIENT POSITIONING AND RESTRAINING MEANS MOUNTING THE HEAD

BACKGROUND OF THE INVENTION

This invention relates to a rotary head assembly and, more particularly, to an improved assembly for resiliently supporting a transducer which is adapted to record and/or reproduce information during its rotation about an axis.

Rotary heads have found ready application in magnetic recording apparatus, such as video tape recorders (VTR) wherein at least one transducer, such as a magnetic head, is rotated about an axis to scan a record medium, such as magnetic tape, a magnetic sheet, or the like, to record information on and/or reproduce information from the medium. In a typical VTR apparatus, a pair of magnetic heads are spaced apart by 180° and scan a circumferential slot, or gap, between upper and lower guide drums about which magnetic tape is deployed. In typical VTR apparatus, the rotary heads are effective to scan parallel slant tracks across the tape.

In many recording/reproducing processes, and in particular, during magnetic recording/reproducing in a typical VTR, the quality of the recorded or reproduced signal depends, to a great extent, upon the relative contact between the rotary heads and the scan medium. In particular, contact pressure is a significant parameter which has a great influence on the quality of recording/reproducing.

In conventional recording/reproducing apparatus, a rotary force is imparted to a drive member, and the heads are fixedly secured to the drive member. In a typical apparatus, the drive member may be in the form of a pair of oppositely disposed rigid arms which are joined to an axis of rotation, and respective heads are secured to the opposite ends of the respective arms. In this type of assembly, the heads are, of course, completely restrained from radial movement with respect to the rotary axis so that contact pressure between the heads and the scanned medium is determined solely by the tension of that medium. As a consequence thereof, if the medium, such as tape, is under high tension, then the resultant contact pressure, when considered in combination with the relatively high head speed, causes severe wear on the head itself, whereby the heads undergo rapid deterioration.

A head assembly has heretofore been proposed wherein contact pressure between the head and medium is not determined solely by the tension of the medium. This head assembly, described in U.S. Pat. No. 3,673,347, includes an arm which is pivotally secured to a rotary disc and which is adapted to support a magnetic head at its free end. When the disc rotates, centrifugal force is exerted on the head, whereby the rigid arm pivots to thus urge the head radially outward and into contact with magnetic tape. A spring has one end secured to the disc and its other end secured to the arm to thus limit the pivotal movement of the arm. Once the disc stops rotating, the spring causes the arm to pivot in an opposite direction so as to urge the head into a storage compartment.

In practice, the aforedescribed patented head assembly fails to prevent the heads from vibrating or otherwise bouncing against the tape. Consequently, the recording/reproducing characteristics of such a device are less than perfect and, to a great extent, are deteriorated. It is believed that such undesirable characteristics can be attributed to the use of the rigid pivot arm which supports the head.

OBJECTS OF THE INVENTION

Therefore, it is an object of the present invention to provide an improved rotary head assembly which avoids the aforenoted defects attending prior art devices.

Another object of this invention is to provide a rotary head assembly wherein a transducer is resiliently supported on a rotating device.

Yet another object of this invention is to provide a head assembly wherein a resilient support is provided for the dual purpose of resiliently supporting a transducer and exerting a counter force on the transducer opposite to centrifugal forces exerted during rotation thereof.

It is an additional object of this invention to provide an improved rotary head assembly wherein a transducer is resiliently supported in a frame structure and the frame itself is resilient.

A still further object of this invention is to provide an improved head assembly wherein a frame is coupled to a rotary drive member and a transducer is disposed to "resiliently float" in the frame.

Various other objects and advantages of the present invention will become apparent from the forthcoming detailed description and the novel features will be particularly pointed out in the appended claims.

SUMMARY OF THE INVENTION

In accordance with this invention, a rotary head assembly is provided including a transducer for recording and/or reproducing information, the transducer being resiliently supported on a resilient support member which, in turn, is secured to a transducer receiving structure, the latter being coupled to a rotary drive device, whereby the transducer is rotated about an axis of rotation; the resilient support member serving to both support the transducer and exert a restraining force thereon which is opposite to centrifugal forces which are exerted when the transducer is rotated.

BRIEF DESCRIPTION OF THE DRAWINGS

The forthcoming detailed description will best be understood in conjunction with the accompanying drawings in which.

DETAILED DESCRIPTION OF CERTAIN ONES OF THE PREFERRED EMBODIMENTS

Before proceeding with the detailed description of this invention, it should be understood that the improved head assembly described herein can be used to record information on and/or reproduce information from a recording medium. Preferably, the head assembly is used in a rotary head transducing device, although this specific use is not intended to limit the present invention. Additionally, although various forms of information recording/reproducing are contemplated, the preferred embodiments of this invention will be described in the environment of magnetic recording/reproducing. Nevertheless, it should be clearly recognized that the head assembly of this invention readily can be used to record and/or reproduce information from any other type of medium.

Figure 1:
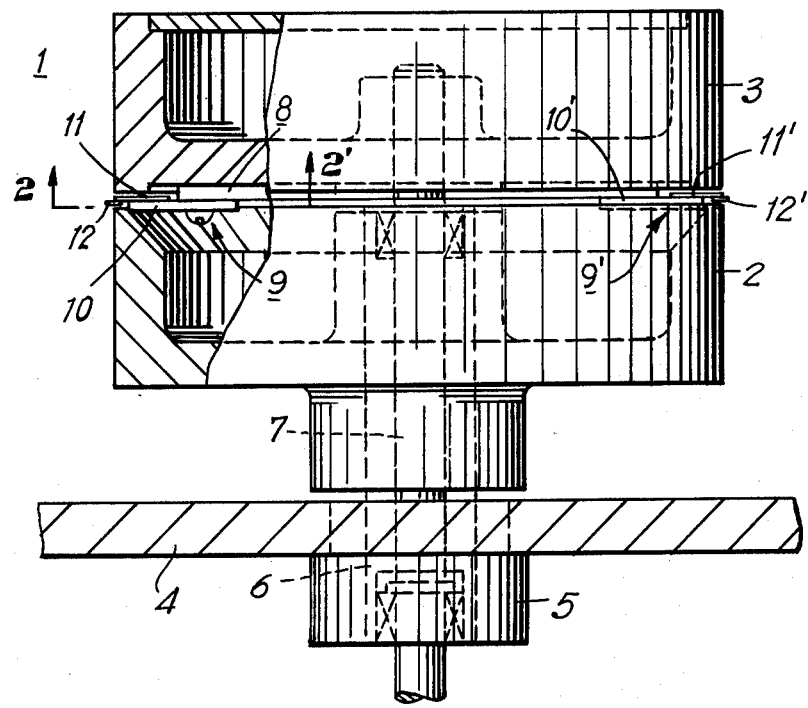
FIG. 1 is a partial sectional view of one type of recording apparatus wherein the present invention finds ready application.

Turning now to the drawings, wherein like reference numerals are used throughout, FIG. 1 illustrates one type of magnetic recording/reproducing apparatus wherein the head assembly of this invention can be used. The illustrated apparatus is a magnetic recorder/reproducer and, in one embodiment thereof, comprises a video tape recorder (VTR). However, as will soon become apparent, the head assembly of this invention can be used in a magnetic sheet recorder or other types of magnetic recording systems.

The illustrated VTR is of the type including a guide drum having a lower portion 2 and an upper portion 3 spaced therefrom so as to define a circumferential slot, or gap, therebetween. The guide drum is adapted to receive magnetic tape (not shown) which is deployed about at least a portion of the circumferential slot. A pair of magnetic head assemblies 9 and 9' are rotatably secured within the guide drum so as to scan the circumferential slot and are adapted to extend through the slot into contact with the tape.

The lower guide drum 2 is rigidly mounted on a chassis 4 and a bearing member 6 extends through the chassis and the lower drum to rotatably support the upper guide drum 3. A shaft 7 extends through the bearing and is mechanically connected to the upper drum 3. A suitable drive source (not shown), such as an electric motor, imparts rotary motion to the shaft so that the upper drum is rotated thereabout.

A head support bar 8 is attached to a lower portion of the drum 3 and the head assemblies 9 and 9' are secured to the support bar so as to be rotated with the drum. A transducer, such as a head chip 12, is mounted on a frame 11 which is included in each head assembly.

Figure 2:
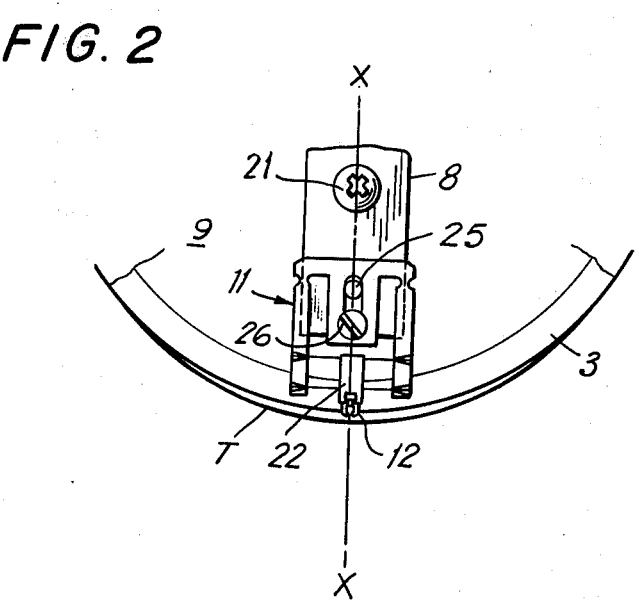
FIG. 2 is a plan view showing one embodiment of a head assembly in operable cooperation with a recording medium.
Figure 3:
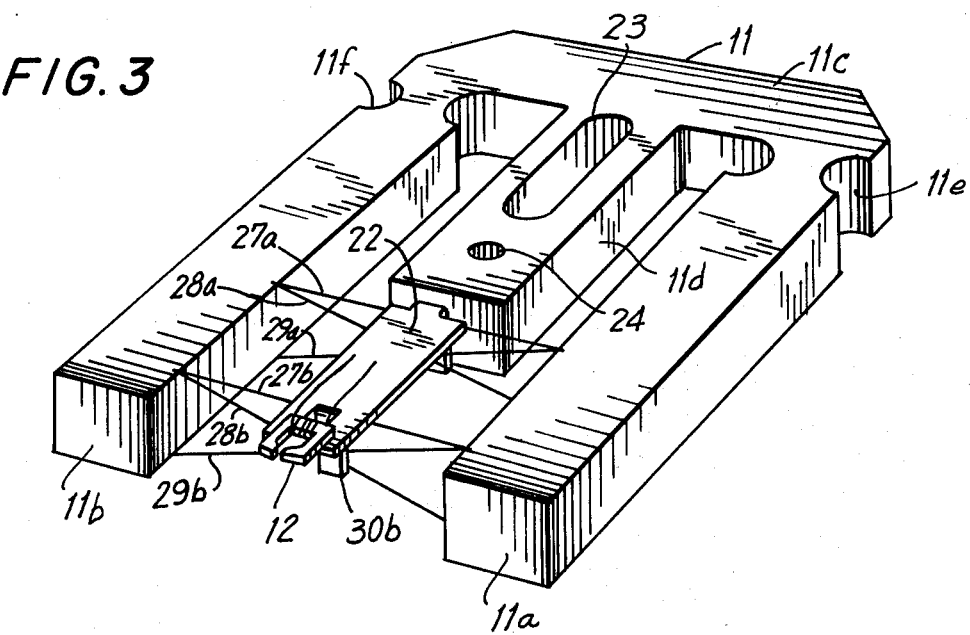
FIG. 3 is an illustration of one embodiment of the present invention.
Figure 4:
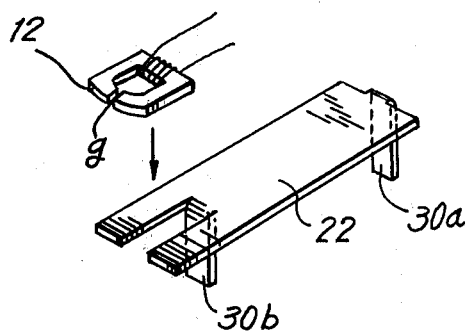
FIG. 4 is an exploded view of some of the components included in the present invention.

A more detailed description of a magnetic head assembly is now provided with respect to the illustrations of FIGS. 2–4. FIG. 2 is a plan view taken along the lines 2—2' of FIG. 1. In the interest of simplification, the drum 3 is omitted from FIG. 2. However, the support bar 8 is shown and, as indicated, may be attached to the drum by suitable means, such as a screw 21. It should be appreciated that the support bar 8 may comprise two rotary arms spaced 180° apart and joined to the shaft 7 so as to be rotated about the axis of rotation established by the shaft. If desired, the rotary arms need not be secured to the drum 3 and, therefore, may rotate with respect thereto.

The head assembly 9 shown in FIG. 2 includes the frame 11 which is adjustably mounted on a free end of a rotary arm 8. The frame is seen to be substantially U-shaped and further includes a center arm portion which lies symmetrically on a longitudinal axis X—X of the arm 8. It is appreciated that this axis X—X coincides with a diameter of the drum 3.

The frame 11 is formed of non-magnetic material which exhibits relatively high resilient characteristics. One such material from which the frame may be formed is phosphor bronze. the frame, which may thus be formed of a phosphor bronze plate, has a thickness of approximately 3mm.

The elongated members forming the respective arms of the U-shaped frame are adapted to receive the head chip 12, such as a magnetic transducer, the head chip being mounted on a mounting plate 22. As shown, the mounting plate is resiliently supported by a resilient support, such as a plurality of resilient members, which extends between the arms of the U-shaped frame 11. Thus, as resiliently supported in the frame 11, and as mounted on the arm 8, the head chip 12 is seen to extend slightly beyond the periphery of the guide drum to thus contact magnetic tape T. As supported in the frame 11, the head chip is suitably disposed for smooth scanning contact with the tape without accompanying vibrations and bounce.

FIG. 3 shows, more particularly, that the U-shaped frame 11 is comprised of arms 11a and 11b, and that the center arm 11d is provided to affix the frame to the rotary arm 8. The arms 11a and 11b are formed of resilient material and, in addition, are provided with notches 11e and 11f at the points where they join the cross-piece 11c. These notches provide further resiliency to the arms so that, as will soon be described, the arms are capable of resiliently pivoting with respect to the cross-piece.

The center arm portion 11d is provided with an elongated slot 23 to receive a guide pin 25 which extends from the arm 8, as shown in FIG. 2. The portion 11d also is provided with a mounting hole 24 through which a screw 26 extends into a tapped hole in the rotary arm 8 so as to secure the frame to the rotary arm, as also shown in FIG. 2.

In the embodiment of FIG. 3, the resilient support member upon which the transducer is resiliently supported is comprised of first and second spaced apart sets of wire springs. In particularly, the first set of wire springs includes the springs 27a, 28a and 29a. The second set of wire springs includes the springs 27b, 28b and 29b. As one example thereof, the wire spring 27a extends between the arms 11a and 11b of the U-shaped frame and is shown as being secured to the upper edge, or surface of these arms. The wire spring 28a extends from the lower edge, or surface of the arm 11a to the upper edge, or surface of the arm 11b. Similarly, the wire spring 29a extends from the lower edge or surface of the arm 11b to the upper edge, or surface, of the arm 11a. The respective springs 28a and 29a thus intersect, or cross, at the axis X—X. The second set of wire springs is disposed in the same configuration as the first set of wire springs and, as shown, is spaced therefrom.

The transducer mounting plate 22, preferably formed of phosphor bronze, and with a thickness of, approximately, 0.3mm., is mounted upon and thus supported by the first and second sets of wire springs. In particular, a central axis of the mounting plate 22 is aligned with the intersection defined by the wire springs 28a and 29a and with the intersection defined by the wire springs 28b and 29b.

The mounting plate is shown in greater detail in FIG. 4 and is seen to be of rectangular shape and provided with a pair of depending tongues 30a and 30b at its opposite ends. The aforenoted respective intersecting points defined by the wire springs are secured to the respective depending tongues, as shown. In one example, the wire springs may be soldered to the depending tongues. Alternatively, the wire springs may be spot-welded to the tongues or they may be otherwise fastened thereto, as by hooking the springs to the tongues, winding the springs about the tongues, and the like.

The transducer 12, which is shown as a magnetic head chip having a core and a coil wound thereon, and defining a gap g therein, is mounted on the front portion of the mounting plate 22. For obvious reasons, the mounting plate should not be of magnetic material. When the head chip is symmetrically positioned on the mounting plate, it will be seen the the gap g overlies the axis X—X. Thus, in assembled form, the respective arms 11a and 11b of the U-shaped frame are symmetrical with respect to the center arm portion 11d and, likewise, are symmetrical with the axis X—X. Also, the resiliently supported mounting plate 22 and head chip 12 thereon are resiliently supported to be symmetrical with the axis X—X.

Because of this symmetrical relationship, the mounting plate 22 and head chip 12 thereon is permitted to be moved only in the radial direction, that is, only along the axis X—X, in response to the centrifugal force exerted thereon when the head assembly is rotated, as by the rotation of the arms 8. Of course, the resilient support members, that is, the sets of wire springs, exert a restraining force on the mounting plate, and thus the head chip, which is opposite to the centrifugal force. Thus, displacement of the head chip is caused by the centrifugal force which acts against the resilient force exerted by the wire springs. In addition, since the arms 11a and 11b of the frame are of resilient material, these arms pivot inwardly with respect to the cross-piece of the frame when the centrifugal force urges the mounting plate and the head chip in the radially outward direction. Thus, the head chip "resiliently floats" within the frame structure so as to properly contact the recording medium with suitable contact pressure, but is not subjected to bounce, vibration, or undesired mistracking. Consequently, the useful lifetime, or longevity, of the transducer is greater than that of heads which previously have been used in other forms of head assemblies. The head is subjected to less deterioration and mechanical defects. As one example, if the rotary arm 8 is driven such that the relative speed between the transducer and the magnetic medium is between 11 and 15 meters per second, then the desirable contact pressure of between 50 and 100 grams is produced to thus provide optimum recording and/or reproducing characteristics.

Figure 5:
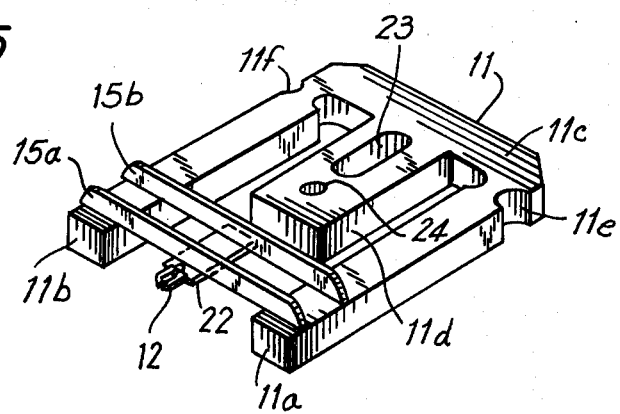
FIG. 5 shows another embodiment of this invention.

Referring now to FIG. 5, another embodiment of this invention is shown. In this embodiment, the sets of wire springs which formed the resilient support members of the previously described embodiment are replaced by a pair of resilient plates 15a and 15b. As shown, these plates extend between the arms 11a and 11b and are spaced apart from each other. The mounting plate 22 is supported by the resilient plates. Although the illustrated embodiment shows that the resilient plates extend across the upper edges, or surfaces, of the arms 11a and 11b, and that the mounting plate 22 is suspended from these resilient plates, it is readily apparent that various other mounting configurations are envisaged. Thus, the resilient plates may extend across the lower surfaces of the arms of the U-shaped frame and the mounting plate 22 may be mounted on the upper edges of these resilient plates.

Figure 6:
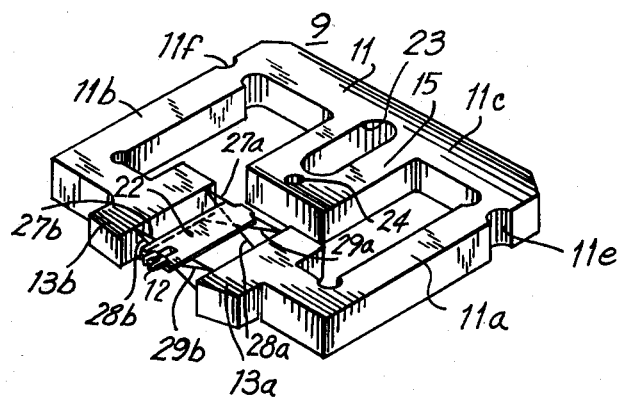
FIG. 6 shows a still further embodiment of this invention.

In the embodiment shown in FIG. 6, the respective arms 11a and 11b are seen to terminate in end portions 13a and 13b, respectively, which are disposed in opposite, facing relation to each other. Thus, the frame structure here is more accurately described as a C-shaped frame. In this configuration, the stronger resilient characteristics of the frame are exploited. Thus, the "resilient floating" of the mounting plate and head chip is attributed more to the characteristics of the frame than the resilient quality of the wire springs. Of course, if desired, the resilient support members shown in FIG. 5 may be substituted for the resilient members of FIG. 6.

Figure 7:
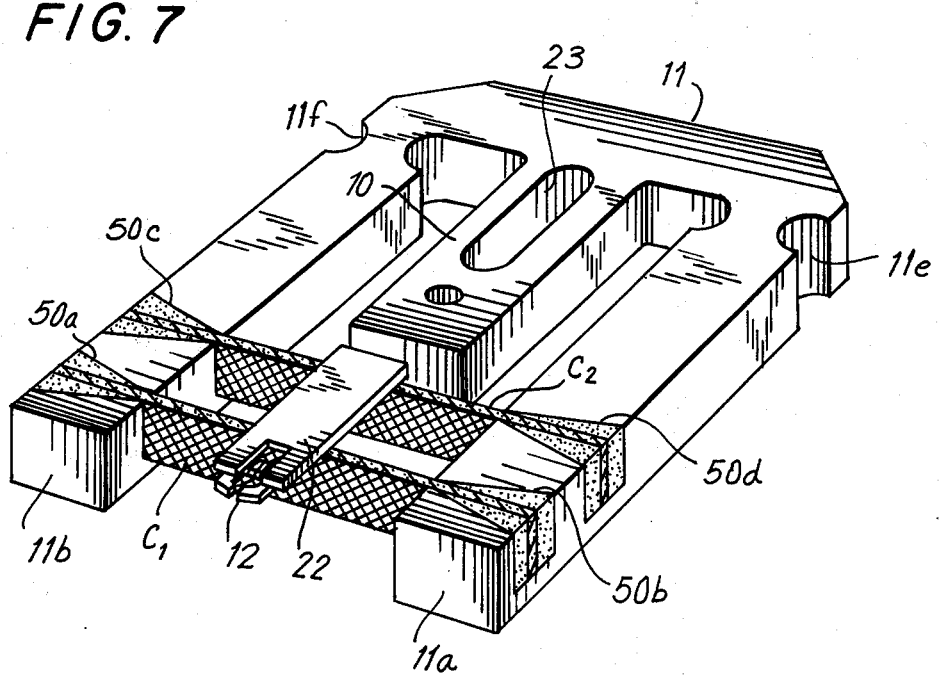
FIG. 7 depicts yet another embodiment of this invention.

In the embodiment shown in FIG. 7, the resilient support members are formed of carbon fiber material to form resilient support plates, or strips, C1 and C2. These strips are secured to the arms 11a and 11b by providing a first pair of tapered recesses 50a and 50b in the respective arms for the first strip C1, and a second pair of tapered recesses 50c and 50d in the respective arms for the second strip C2. As shown, the respective recesses taper towards the interior of the frame 11.

The carbon fiber support strips are formed, typically, by weaving the fibers into a cloth and then fixing with thermosetting resins, such as epoxy resin, phenol resin, melamine resin, polyester resin, silicon resin, or urea resin. Then, the arms 11a and 11b are urged toward each other, as by pivoting, with respect to the cross-piece of the frame, the carbon fibers, now woven into cloth, are stretched between the respective pairs of recesses, and a thermosetting resin, such as one of the aforementioned resins, is used to fill the recesses. After the thermosetting resins have fully hardened, the respective arms 11a and 11b are permitted to return to their normal, or quiescent positions, so that the carbon fiber support strips are stretched between these arms. One advantage of using the embodiment shown in FIG. 7 is that the resilient support members shown therein can be more easily formed and assembled to the frame than the resilient support members described with respect to the other embodiments.

While the present invention has been particularly shown and described with certain preferred embodiments thereof, and with respect to a particular application thereof, it should be readily apparent that the teachings of this invention can be applied to other information recording/reproducing apparatus using other recording media. Consequently, it is apparent that various changes and modifications in form and details may be made without departing from the spirit and scope of the invention. It is therefore intended that the appended claims be interpreted as including all such changes and modifications.

What is claimed is:

1. A rotary head assembly comprising, a generally U-shaped frame having a pair of spaced apart arms which are joined together at one end and are capable of resilient flexing toward and away from each other, means for mounting said frame for movement in a circular path with the free end portions of said arms extending generally radially outward in respect to the center of such path, a head member for recording and/or reproducing information signals on a record medium and which is dimensioned to fit between said spaced apart arms with substantial clearance therebetween, and resilient support means extending between said arms and being secured intermediate the arms to said head member for supporting the latter in respect to said frame so that centrifugal movement of said head member in response to movement of said frame in said circular path is resiliently resisted by said resilient support means and by the resilient flexing of said arms.

2. A rotary head assembly according to claim 1; in which said resilient support means includes a plurality of elongated spring members extending substantially parallel to each other between said arms of the frame.

3. A rotary head assembly according to claim 2; in which said free end portions of the arms terminate in inwardly directed parts between which said elongated spring members extend.

4. A rotary head assembly according to claim 2 in which said spring members are constituted by respective elongated plates of resilient metal.

5. A rotary head assembly according to claim 2; in which said elongated spring members are constituted by resilient wires.

6. A rotary head assembly according to claim 5; in which said head member includes a transducer and a transducer mounting plate having said transducer secured to an end of said mounting plate, and said transducer mounting plate is supported on said wires midway between said arms.

7. A rotary head assembly according to claim 6; in which said mounting plate has depending tabs secured to said wires.

8. A rotary head assembly according to claim 2; in which said spring members are constituted by strips of resin-impregnated carbon fiber material.

9. A rotary head assembly according to claim 8; in which said arms have mortise-shaped recesses in which the respective ends of said strips are located and secured by thermosetting resin with said strips being under tension.

* * * * *